July 17, 1928.

J. G. SWAIN

COUNTERWEIGHT

Filed Dec. 31, 1926

1,677,855

INVENTOR.
JOSEPH G. SWAIN.
BY Ely & Barrow
ATTORNEYS

Patented July 17, 1928.

1,677,855

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

COUNTERWEIGHT.

Application filed December 31, 1926. Serial No. 158,229.

This invention relates to counterweights, especially those for balancing wheel, rim and tire assemblies as used on automobiles.

The purpose of the invention is to provide means for counterweighting an automobile wheel to balance the uneven weights therein caused by the valve assembly, driver, clamps, etc. An object of the invention is to provide a counterweight which can be assembled with the wheel without the necessity of removing the rim or tire. Another object is to construct the counterweight so that weights of different values may be interchangeable. A further object is to provide a construction whereby the counterweight will not become loosened or lost.

The foregoing and other objects of the invention are obtained by the construction illustrated in the accompanying drawings and described below. It is to be understood that the device is not limited to the specific construction thereof disclosed herein.

Figure 1:
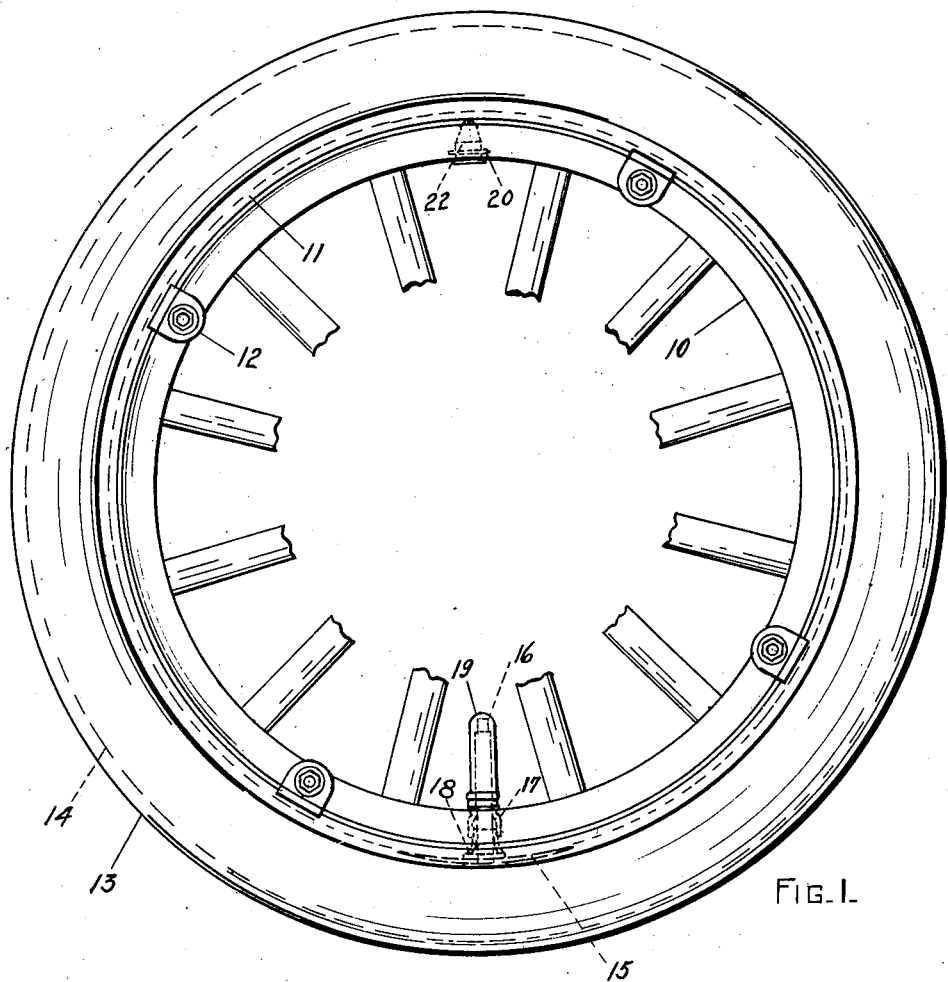
Figure 1 is a side elevation of an automobile wheel illustrating the relative position of a device embodying the principles of the invention.
Figure 2:
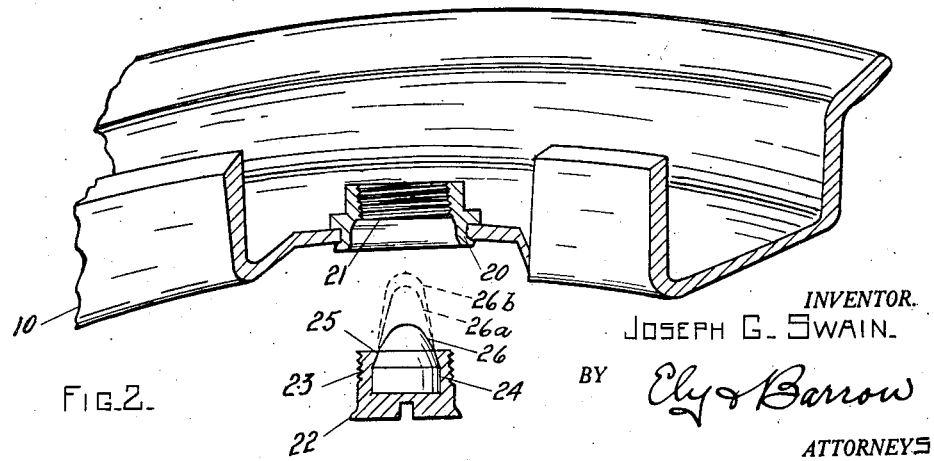
Figure 2 is perspective detail of a portion of the felloe partly broken away, the counterweight being shown in position for assembly.

Referring more particularly to the drawings, 10 represents the felloe of an automobile wheel and 11 is a rim clamped thereon by clamps 12. A tire casing 13 enclosing an inner tube 14 is mounted on the rim, the inner tube being provided with the usual valve base 15 and valve stem 16. Telescoping tubular projections 17 and 18 on the felloe and rim, respectively, serve as a protective housing for the valve stem and also as a driver for preventing relative rotation between the felloe and the rim. A valve cap 19 may be screwed over valve stem 16.

The valve base 15, stem 16, projections 17 and 18, and cap 19 all grouped together have an unbalancing effect on the wheel. A counterweight is accordingly provided on the opposite side of the wheel and comprises an annular ferrule 20 riveted to the felloe, the inner periphery of the ferrule being provided with screw threads 21. A plug 22, provided with screw threads 23 is adapted to be screwed into the ferrule from the radially inner side of the felloe so that it is easily accessible for assembling or interchanging counterweights without removing the rim or tire. The plug is constructed with a recess 24 having an overhanging, annular shoulder 25. A slug 26 of lead or other weighting material is cast in the recess to form an integral balancing weight. The portion 27 of the slug projecting from the recess may vary in size, as indicated by dotted lines at 27$^a$ and 27$^b$, in order to produce plugs of different weights.

To counterweight a wheel, plugs of various weights are successively screwed into the ferrule until a proper balance is obtained. Centrifugal force in the revolving wheel tends to tighten slug 26 in its recess by forcing it against shoulder 25, thus the slug cannot become loose or drop out. Where the unbalancing elements are spaced apart, the counterweight is placed at a point on the felloe diametrically opposite the center of the aggregate of said elements, or if necessary a number of equal or different sized counterweights may be distributed around the rim to obtain the proper balance.

Modifications of the device may be resorted to without departing from the spirit of the invention or from the scope of the appended claim.

What is claimed is:

In an automobile wheel assembly comprising on one side of the wheel, a rim driver and a tire valve, a counterweight attached to the felloe diametrically opposite said driver and valve, said counterweight including a plug attached to the felloe of the wheel and having a shouldered recess therein, and a slug of weighting material cast in the recess.

JOSEPH G. SWAIN.